United States Patent [19]

Schor

[11] 4,280,670
[45] Jul. 28, 1981

[54] WINDING CORE FOR MAGNETIC TAPE ADAPTED FOR STACKING

[75] Inventor: S. Allen Schor, Rancho Palos Verdes, Calif.

[73] Assignee: Elmar Plastics, Inc., Carson, Calif.

[21] Appl. No.: 140,514

[22] Filed: Apr. 15, 1980

Related U.S. Application Data

[63] Continuation of Ser. No. 24,850, Mar. 28, 1979, Pat. No. 4,201,353.

[51] Int. Cl.³ .......................................... B65H 75/18
[52] U.S. Cl. .................................................. 242/68.5
[58] Field of Search ................... 242/68.5, 71.8, 118.3, 242/118.31, 118.41; 206/391, 394, 389, 503, 509

[56] References Cited

U.S. PATENT DOCUMENTS

| | | | |
|---|---|---|---|
| 3,508,719 | 4/1970 | Browning | 242/71.8 |
| 3,848,310 | 11/1974 | Steinback | 242/68.5 |
| 4,069,914 | 1/1978 | Damsky | 206/394 |
| 4,081,151 | 3/1978 | Ender | 242/68.5 |
| 4,201,353 | 5/1980 | Schor | 242/68.5 |

Primary Examiner—Edward J. McCarthy

Attorney, Agent, or Firm—Nilsson, Robbins, Dalgarn, Berliner, Carson & Wurst

[57] ABSTRACT

A winding core for magnetic tape is adapted for stacking between like winding cores. The core has a substantially annular body with top and bottom substantially annular body surfaces, an outer circumferential body surface to wind the tape about, a discontinuous inner circumferential body surface and a set of recess surfaces extending between the annular body surfaces and between portions of the discontinuous inner circumferential body surface. The recess surfaces define a circular array of recesses for the core. Opposed sets of projections rise from the top and bottom annular surfaces. Each set forms a circular array; and each projection is adapted to mate with a recess of a like top or bottom sandwiching winding core. The projections of each array of projections are spaced to mate with every third recess along the array of recesses of a sandwiching core. The structure of the core permits stacking of the annular body surfaces against one another and enables tape having a width approximately the same as that of the outer circumferential surface to support the tape wound about an adjacent core when the cores are stacked.

8 Claims, 3 Drawing Figures

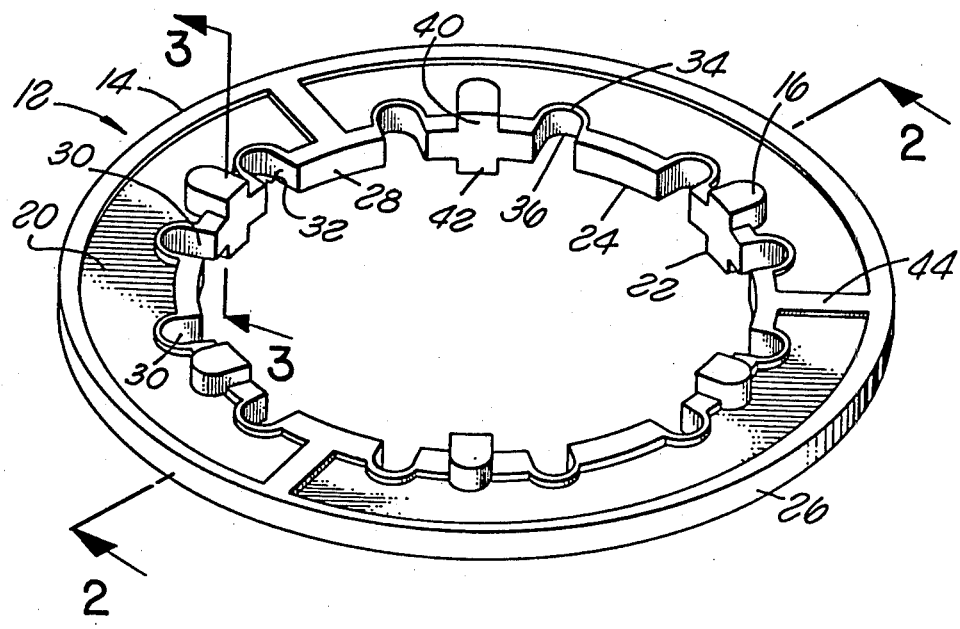
FIG. 1
FIG. 2
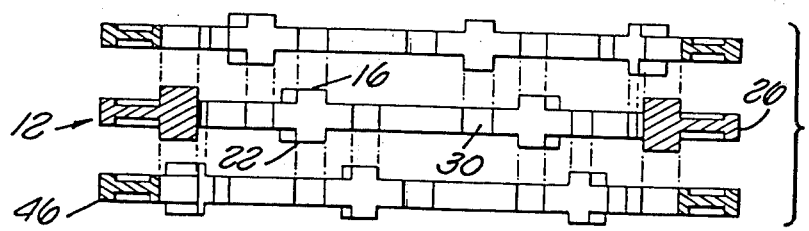
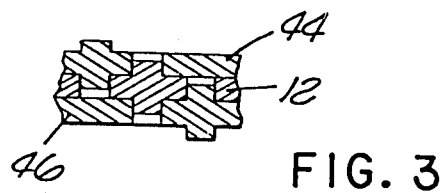
FIG. 3

WINDING CORE FOR MAGNETIC TAPE ADAPTED FOR STACKING

This is a continuation of application Ser. No. 24,850 filed Mar. 28, 1979, now U.S. Pat. No. 4,201,353.

BACKGROUND OF THE INVENTION

This invention pertains to flangeless winding cores for magnetic tape, adapted for stacking with their surfaces in contact and the tapes wound thereabout in supporting contact.

The recording of sound on magnetic tape and the packaging and marketing of such tape recordings has become a large-scale industry incorporating many mass production techniques. Standardized winding cores used in transporting the tapes and handling the tapes during processing are generally adapted to take advantage of such techniques.

Two factors are of particular importance with respect to such techniques. First, the capability to stack such cores with tape wound therearound, but without intervening support material between the tape on adjacent cores, permits increased efficiency in transporting and handling the cores and tape. Secondly, the expensive and sophisticated machinery utilized in processing the tape in large part is adapted to employ holding devices for the cores which create a significant design requirement. Briefly, to accommodate stacking efficiency, the core should generally have a height approximately equal to the width of the tape wound therearound. On the other hand, to accommodate processing with the existing expensive machinery, a greater height than the width of many of the tape sizes, is required.

Ender et al, U.S. Pat. No. 4,081,151 addresses these somewhat contradictory requirements by providing deformations which alternately rise on opposite (top and bottom) sides of a core. These deformations take a rather complex shape permitting interlocking of a deformation rising from the top side of a lower core with the recessed underside of a deformation rising from the top side of an upper core. The height of such cores, apart from the projections, may then generally be about the same as the width of the tape. With respect to such height, Ender discloses projections extending about one half of that height beyond the part of the core having the height; however, cores along the lines of that in Ender, have been employed with projections larger than this ratio. Concerning another aspect, spindle indentations normally required in the winding cores, as a result of the other aspects of the design in Ender, are located along the deformations, and follow an alternating pattern resulting from the alternating pattern of the deformations.

In another embodiment, Ender discloses a winding core with a bead-like ridge-valley configuration along the top and bottom of the core; and indentations along a ridge are provided to receive pins projecting from a mating valley to prevent relative rotation of adjacent cores.

Steinback, U.S. Pat. No. 3,848,310 shows spindle indentations along the inside of the hub for a flanged tape reel. Browning, U.S. Pat. No. 3,508,719 shows two sets of interlocking beads along opposite outside surfaces of a flanged tape reel. Herolzer, U.S. Pat. No. 3,696,966 discloses a rise along the inside of a bottom part of a chick carton which fits into a corresponding indentation along the bottom outside surface of a mating bottom for a like carton. Jewell et al, U.S. Pat. No. 3,153,519 shows mounting tubes for yarn packets, with interlocking parts extending between the yarn packets. Taus, U.S. Pat. No. 3,527,344 is of some, lesser interest.

SUMMARY OF THE INVENTION

The present invention satisfies the structural stacking and processing requirements for present-day winding cores used in a mass production environment. It also significantly simplifies the structure of cores of this type. In part, it accomplishes this by employing recesses for a spindle along the core, for mating with projections of an adjacent core in a stack of such cores.

In accordance with the invention, a winding core for magnetic tape, adapted for stacking between like first and second sandwiching cores, includes: a substantially annular body having first and second substantially annular body surfaces, an outer circumferential body surface for winding the tape therearound, a discontinuous inner circumferential body surface and a set of recess surfaces extending between said annular body surfaces and between portions of said discontinuous inner circumferential body surface, such recess surfaces defining a set of recesses for the core; a set of projections rising from the first annular body surface, each for mating with a recess of the set of recesses of the first sandwiching core; and a set of projections rising from the second annular body surface, each for mating with a recess of the set of recesses of the second sandwiching core. Each of the sets of projections may form a circular array of projections while the array of recesses, similarly forms a circular array of recesses. Among other features, the projections of each of the arrays of projections may then be spaced for mating with every third recess along the array of recesses of a sandwiching core.

In accordance with other detailed aspects of the initially described winding core, each of the projections rising from an annular body surface of the core may have an associated, opposed projection rising from the other annular body surface. Such associated, opposed projections may additionally have inner surfaces which intersect the inner circumferential surface of the body of the core.

In accordance with other aspects of the invention, a winding core for magnetic tape, adapted for stacking between first and second sandwiching cores, includes: a substantially annular body having first and second substantially annular body surfaces, an outer circumferential body surface for winding the tape therearound, an inner circumferential body surface and a set of mating surfaces extending between the annular surfaces, such mating surfaces defining a circular array of openings through the body having apertures along each of the annular surfaces; a set of projections rising from the first annular body surface and forming a circular array of projections for mating with openings of the array of openings of the first sandwiching core, such projections rising from positions along the body surface having two of the apertures therebetween; and a set of projections rising from the second annular body surface and forming a circular array of projections for mating with openings of the array of openings of the second sandwiching core, such projections rising from positions along the body surface having two of the apertures therebetween. A core according to these other aspects may further include many of the more detailed features of the initially described core.

BRIEF DESCRIPTION OF THE DRAWINGS

FIG. 1 is a perspective view of a winding core in accordance with the invention.

FIG. 2 is a broken-away, exploded cross sectional view of three of the winding cores of the type shown in FIG. 1 in stacked relation, the view taken along the line 2—2 of FIG. 1 through the middle core.

FIG. 3 is the view of FIG. 2, but unexploded and partially broken away, and taken with reference to the line 3—3 of FIG. 1.

DETAILED DESCRIPTION

Referring to FIG. 1, a winding core 12, in accordance with the invention, has a substantially annular body 14, a set of six projections 16 rising in a circular array from a top, substantially annular surface 20 of the body, and another set of projections 22 rising from a bottom 24 substantially annular surface of the core. The bottom surface (not shown) is, as would be expected, the mirror image of the top surface.

The body 14 of the core 12 has an outer circumferential surface 26 about which a magnetic tape is typically wound and a discontinuous, inner circumferential surface 28. During processing of the magnetic tape wound around the core, a holding device would typically be disposed inside the core against the inner circumferential surface. During such processing, or other handling of the core, a spindle may also, at times, be employed to rotate the core. Along with another function which will be addressed in detail below, a number of recess or mating surfaces 30 of the core extend between the substantially annular body surfaces and between portions 31 of the discontinuous inner circumferential body surface 28, for engagement by such a spindle. These recess surfaces 30 define the extent of 12 recesses 32 forming a circular array of recesses along the inside of the core. Each of these recesses or openings through the body of the core 14 has an aperture 34 along the top surface of the core 20, and an aperture 36 along the bottom surface of the core 24.

By reference to FIG. 1, it will be appreciated that the projections 16 from the top surface 20 are also arranged in a circular array of projections, having positions along the top surface 20 separated by two of the apertures 34 along the top surface. Similarly, the projections 22 rising from the bottom surface 24 are similarly arranged in a circular array, and rise from positions along the core which are separated by two of the apertures 36 along the bottom surface of the core. The two sets or arrays of projections are in fact in opposing relation to one another. Thus, each of the projections is associated with an opposed projection rising from the opposite annular body surface. Further, each of the projections 16 from the top surface has an inner surface 40 which meets the discontinuous inner circumferential surface 28; and each of the projections 22 from the bottom surface 24 has a corresponding inner surface 42, which similarly meets the inner circumferential surface 28. Each of these inner projection surfaces has the same curvature as the inner circumferential surface, and thus as the portion of the inner circumferential surface with which it meets. The relationship between the inner projection and inner circumferential surfaces is adapted to facilitate the mounting of the winding core on the typically-used holding device.

The outer circumferential surface 26 of the core 12 has a height which is approximately equal to the width of the tape which will be wound around the core. Thus, for a standard 3.81 millimeter (0.150 inch)-tape, the surface would typically be approximately 3.96 millimeters (0.156 inch). Thus, when the core is sandwiched between two other, like cores (see FIGS. 2 and 3), the tape wound around a lower core will contact and support the tape wound around the adjacent upper core, without the need for intervening supporting material between the tape carried by such cores. The savings in material and labor, in connection with the mass production techniques currently utilized, is substantial.

To uniformly provide the desired width for the outer circumferential surface 26, the spacing between the top and bottom surfaces 20 and 24 of the core at the outer circumferential surface is uniform along the core. Such spacing for the indicated, exemplary tape width would then typically be 3.96 millimeters (0.156 inch). The same spacing between such surfaces that exists at the outer circumferential surface, also exists at the inner circumferential surface 28, at the recess surfaces 30, and additionally along three strengthening ribs 44 of the top surface and three opposed strengthening ribs (not shown) of the mirror image, bottom surface 24. However, the spacing between the top and bottom surfaces along a large part of the areas of these surfaces is somewhat less, to conserve material. For the previously indicated exemplary dimensions, such a lesser spacing of about 1.83 millimeters (0.072 inch), would typically be employed. To provide the varying spacing and the projections in efficient fashion, the core may conveniently be made of a plastic material, and may be die-cast. However, other materials including metallic materials and wood could also readily be employed.

Referring to FIGS. 2 and 3, the winding core 12 of FIG. 1 is shown sandwiched (exploded from such sandwiching in FIG. 2) between an identical upper sandwiching core 44 and an identical lower sandwiching core 46. By reference to this figure, it will be apparent that the spacing of the projections and recesses along the cores is such that the set of projections from each of the substantially annular surfaces is adapted for mating with every third recess in the array of recesses of an adjacent core. This sort of mating interaction is of substantial significance; for, as a result thereof, each of the projections may extend a distance above the raised part of the annular surface from which it rises, along the inside part of the surface, which is greater than one-half of the spacing between the top and bottom annular surfaces along such part. In the absence of this sort of arrangement, with such a rise ratio for the projections, projections might extend into a recess of a sandwiched core from both of the sandwiching cores, come in contact each other and prevent the surfaces of the sandwiched core from contacting the adjacent surfaces of the sandwiching cores. The height for the projections permitted by the described arrangement facilitates the locking of a core with an adjacent core and adds to the capability of the stacked cores to withstand forces which might tend to rotate the cores relative to one another.

As previously noted, the spacing between the top and bottom annular surfaces 20 and 24 in the core of FIG. 1 is the same near the outer circumferential surface 26 as it is near the inner circumferential surface 28 and recess surfaces 30. Thus, the projections rising from an annular body surface also rise a distance beyond the associated annular surface, at the outer circumferential surface, which is greater than one-half of the spacing between the annular surfaces at the outer circumferential surface. For the previously indicated exemplary spacings the projections might typically rise 2.46 millimeters (0.97 inch) above the level of the top and bottom surfaces at the inside and outside of the core.

It will be appreciated that many changes and modifications in the described embodiment may be made without departing form the scope and spirit of the invention.

What is claimed is:

1. A winding core for magnetic tape, adapted for stacking between like first and second sandwiching cores, comprising:

a substantially annular body having first and second substantially annular body surfaces, an outer circumferential body surface for winding the tape therearound, a discontinuous inner circumferential body surface and a set of recess surfaces extending between said annular body surfaces and between portions of said discontinuous inner circumferential body surface, said recess surfaces defining a set of recesses for the core;

a set of projections rising from said first annular body surface, each for mating with a recess of the set of recesses of the first sandwiching core;

each of said set of recesses of the core being adapted for mating with a projection of the set of projections rising from the first annular body surface of the second sandwiching core.

2. A winding core as defined in claim 1 wherein said set of projections rising from said annular body surface of the core forms a circular array of projections and said set of recesses for the core forms a circular array of recesses.

3. A winding core as defined in claim 2 wherein said projections of said array of projections are spaced for mating with every third recess of the array of recesses of the first sandwiching core.

4. A winding core as defined in claim 3 wherein the spacing between said annular body surfaces of the core is substantially uniform at said outer circumferential surface and said array of projections from said first annular body surface of the core rises a distance beyond said annular body surface at said circumferential surface which is greater than one-half of said spacing.

5. A winding core for magnetic tape, adapted for stacking between like first an second sandwiching cores, comprising:

a substantially annular body having first and second substantially annular body surfaces, an outer circumferential body surface for winding the tape therearound, an inner circumferential body surface and a set of mating surfaces extending between said annular surfaces, said mating surfaces defining a circular array of openings through said body having apertures along each of said annular surfaces;

a set of projections rising from said first annular body surface and forming a circular array of projections for mating with openings of the array of openings of the first sandwiching core, said projections rising from positions along said body surface having at least one of said apertures therebetween;

each of said array of openings of the body of the core being adapted for mating with a projection of the array of projections rising from the first annular body surface of the second sandwiching core.

6. A winding core as defined in claim 5 wherein the spacing between said annular body surfaces is substantially uniform at said outer circumferential surface and said array of projections from said first annular body surface rises a distance beyond said annular surface at said circumferential surface which is greater than one-half of said spacing.

7. A winding core as defined in claim 5 wherein each of said projections rising from said first annular body surface of the core has an inner surface which intersects said inner circumferential surface of said body of the core.

8. A winding core as defined in claim 5 wherein said projections rising from said first annular body surface of the core rise from positions along said body surface having at least two of said apertures along said annular body surface therebetween.

* * * * *